United States Patent
Fujimoto

(10) Patent No.: US 8,474,310 B2
(45) Date of Patent: Jul. 2, 2013

(54) VALVE FREEZE CONTROL APPARATUS AND SENSOR ELEMENT BREAKAGE CONTROL APPARATUS FOR INTERNAL COMBUSTION ENGINE

(75) Inventor: Takeshi Fujimoto, Obu (JP)

(73) Assignee: Denso Corporation, Kariya (JP)

( * ) Notice: Subject to any disclaimer, the term of this patent is extended or adjusted under 35 U.S.C. 154(b) by 1000 days.

(21) Appl. No.: 12/536,732

(22) Filed: Aug. 6, 2009

(65) Prior Publication Data

US 2010/0032023 A1    Feb. 11, 2010

(30) Foreign Application Priority Data

Aug. 6, 2008    (JP) ................. 2008-202731

(51) Int. Cl.
*G01M 15/04*    (2006.01)
(52) U.S. Cl.
USPC .................... 73/114.55; 73/53.06; 73/114.74
(58) Field of Classification Search
USPC ............. 73/53.05, 53.06, 114.38, 114.52, 73/114.55, 114.69, 114.71, 114.72, 114.74
See application file for complete search history.

(56) References Cited

U.S. PATENT DOCUMENTS

| 4,688,537 | A | * | 8/1987 | Calkins et al. | ................ 123/557 |
| 5,325,836 | A |  | 7/1994 | Orzel et al. | |
| 2004/0026408 | A1 |  | 2/2004 | Morinaga et al. | |
| 2007/0271904 | A1 |  | 11/2007 | Shouda et al. | |
| 2011/0132342 | A1 | * | 6/2011 | Soltis et al. | ................... 123/703 |

FOREIGN PATENT DOCUMENTS

| JP | 2002-161758 | 6/2002 |
| JP | 3345464 | 8/2002 |

* cited by examiner

*Primary Examiner* — Eric S McCall
(74) *Attorney, Agent, or Firm* — Nixon & Vanderhye PC

(57) ABSTRACT

A valve freeze control apparatus for an internal combustion engine includes a concentration sensor, a valve, a freeze control device, and a start determination unit. The concentration sensor is adapted to detect an alcohol concentration of fuel supplied to the internal combustion engine. The valve is provided in one of an intake passage and an exhaust passage of the internal combustion engine, wherein the valve controls flow of air that passes through the one of the intake and exhaust passages. The freeze control device is adapted to limit malfunction of the valve caused by freeze of water in exhaust gas, and the water has been attached to the valve. The start determination unit determines to start the freeze control device when the alcohol concentration detected by the concentration sensor is equal to or greater than a reference value.

16 Claims, 2 Drawing Sheets

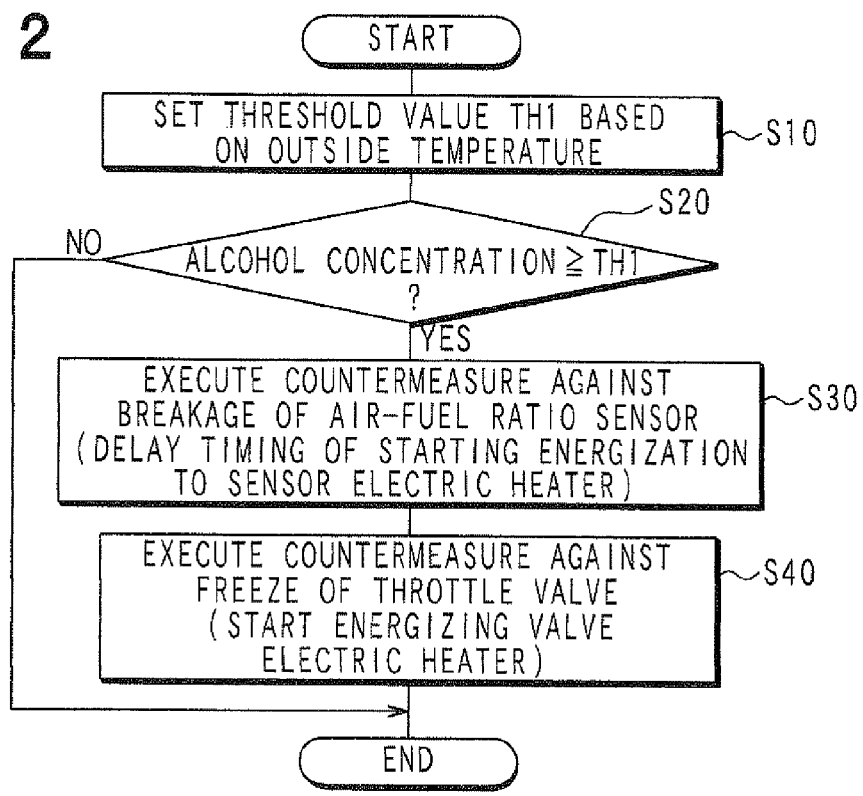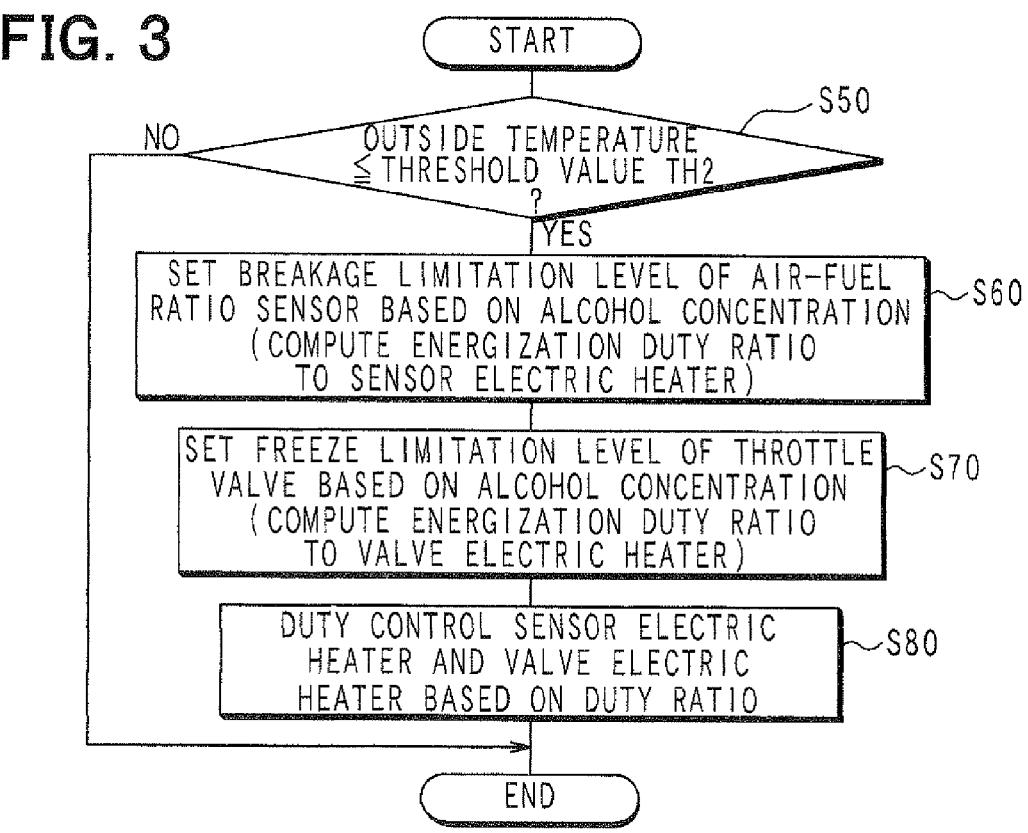

_US 8,474,310 B2_

VALVE FREEZE CONTROL APPARATUS AND SENSOR ELEMENT BREAKAGE CONTROL APPARATUS FOR INTERNAL COMBUSTION ENGINE

CROSS REFERENCE TO RELATED APPLICATION

This application is based on and incorporates herein by reference Japanese Patent Application No. 2008-202731 filed on Aug. 6, 2008.

BACKGROUND OF THE INVENTION

1. Field of the Invention

The present invention relates to a valve freeze control apparatus that limits malfunction of a valve, such as a throttle valve of an internal combustion engine, caused by water that is attached to the valve and that is then frozen. Also, the present invention relates to a sensor element breakage control apparatus that limits the breakage of a sensor element for sensing a specific component concentration in exhaust gas from breaking due to the water that attaches the sensor element.

2. Description of Related Art

During an excessively-low-temperature operational state, where an outside temperature drops below freezing, condensed water attached to a valve (for example, a throttle valve) mounted in an intake passage or an exhaust passage may be frozen even while the internal combustion engine is operated. Then, a rotational shaft portion of the valve may be frozen, and thereby the rotation of the valve may be disabled disadvantageously.

As a countermeasure for the above disadvantage caused by the freeze, JP-A-2002-161758 describes an art that vibrates the throttle valve in order to limit the freeze of the valve when it is determined that a condensed water generation condition is satisfied. For example, the above condensed water generation condition includes that the outside temperature is equal to or lower than a predetermined temperature.

Also, there is a case, where the internal combustion engine includes an exhaust gas sensor device that has a sensor element and an electric heater. The sensor element detects an $O_2$ concentration and an $NO_x$ concentration in exhaust gas, and the electric heater heats the sensor element to activate the sensor element. In the above the internal combustion engine, when the electric heater is operated to heat the sensor element while condensed water is attached to the sensor element, the water-attached part of the sensor element may locally have a lower temperature compared with the other part of the sensor element. As a result, the above local cooling may cause thermal strain of the sensor element, and thereby the sensor element may break disadvantageously.

As a countermeasure against the above disadvantage caused by the attached water. JP-A-2004-69644 corresponding to US2004/0026408) describes that during a period, in which a condensed water generation condition is satisfied, the energization to the electric heater is prohibited such that breakage of the sensor element is limited. The above condensed water generation condition may be that temperature in the exhaust pipe is equal to or lower than a predetermined temperature.

Recently, alcohol-gasoline mixture and alcohol fuel are proposed as alternative fuel for the internal combustion engine. In the above, the alcohol-gasoline mixture has alcohol, such as methanol, ethanol, mixed with gasoline, and the alcohol fuel is made based only on alcohol. In the present specification, the above alcohol-gasoline mixture and the above alcohol fuel are indicated as alcohol blended fuel. The above disadvantages for the gasoline may occur when the alcohol blended fuel is supplied for combustion of the internal combustion engine.

SUMMARY OF THE INVENTION

The present invention is made in view of the above disadvantages. Thus, it is an objective of the present invention to address at least one of the above disadvantages.

To achieve the objective of the present invention, there is provided a valve freeze control apparatus for an internal combustion engine, which apparatus includes a concentration sensor, a valve, a freeze control device, and start determination means. The concentration sensor is adapted to detect an alcohol concentration of fuel supplied to the internal combustion engine. The valve is provided in one of an intake passage and an exhaust passage of the internal combustion engine, wherein the valve controls flow of air that passes through the one of the intake and exhaust passages. The freeze control device is adapted to limit malfunction of the valve caused by freeze of water in exhaust gas, and the water has been attached to the valve. The start determination means determines to start the freeze control device when the alcohol concentration detected by the concentration sensor is equal to or greater than a reference value.

To achieve the objective of the present invention, there is also provided a valve freeze control apparatus for an internal combustion engine, which apparatus includes a concentration sensor, a valve, a freeze control device, and limitation level setting means. The concentration sensor is adapted to detect an alcohol concentration of fuel supplied to the internal combustion engine. The valve is provided in one of an intake passage and an exhaust passage of the internal combustion engine, wherein the valve controls flow of air that passes through the one of the intake and exhaust passages. The freeze control device is adapted to limit malfunction of the valve caused by freeze of water in exhaust gas, and the water has been attached to the valve. The limitation level setting means changes a limitation level for limiting the freeze of water by controlling the freeze control device. The limitation level setting means increases the limitation level of the freeze more as the alcohol concentration detected by the concentration sensor indicates a higher concentration.

To achieve the objective of the present invention, there is also provided a sensor element breakage control apparatus for an internal combustion engine, which apparatus includes a concentration sensor, an exhaust gas sensor device, a breakage limiting device, and start determination means. The concentration sensor is adapted to detect an alcohol concentration of fuel supplied to the internal combustion engine. The exhaust gas sensor device is provided in an exhaust passage of the internal combustion engine, wherein the exhaust gas sensor device includes a sensor element and an element heating device. The sensor element is adapted to sense a concentration of a specific component in exhaust gas. The element heating device is adapted to heat the sensor element. The breakage limiting device is adapted to limit breakage of the sensor element when the element heating device is heated while water in exhaust gas is attached to the sensor element. The start determination means determines to start the breakage limiting device when the alcohol concentration detected by the concentration sensor is equal to or greater than a reference value.

To achieve the objective of the present invention, there is also provided a sensor element breakage control apparatus for an internal combustion engine, which apparatus includes a concentration sensor, an exhaust gas sensor device, a breakage limiting device, and limitation level setting means. The concentration sensor is adapted to detect an alcohol concentration of fuel supplied to the internal combustion engine. The exhaust gas sensor device is provided in an exhaust passage of the internal combustion engine, wherein the exhaust gas sensor device includes a sensor element and an element heating device. The sensor element is adapted to sense a concentration of a specific component in exhaust gas. The element heating device is adapted to heat the sensor element. The breakage limiting device is adapted to limit breakage of the sensor element when the element heating device is heated while water in exhaust gas has been attached to the sensor element. The limitation level setting means changes a limitation level for limiting the breakage of the sensor element by controlling the breakage limiting device, wherein the limitation level setting means increases the limitation level of the breakage more as the alcohol concentration detected by the concentration sensor indicates a higher concentration.

BRIEF DESCRIPTION OF THE DRAWINGS

The invention, together with additional objectives, features and advantages thereof, will be best understood from the following description, the appended claims and the accompanying drawings in which:

FIG. 2 is a flow chart illustrating a procedure for determining whether to executed the countermeasure against freeze and the countermeasure against the breakage caused by the attached water according to the first embodiment; and FIG. 3 is a flow chart illustrating a procedure for setting a freeze limitation level of a throttle valve, and for setting a breakage limitation level of a sensor element according to the second embodiment of the present invention.

DETAILED DESCRIPTION OF PREFERRED EMBODIMENTS

Figure 1:
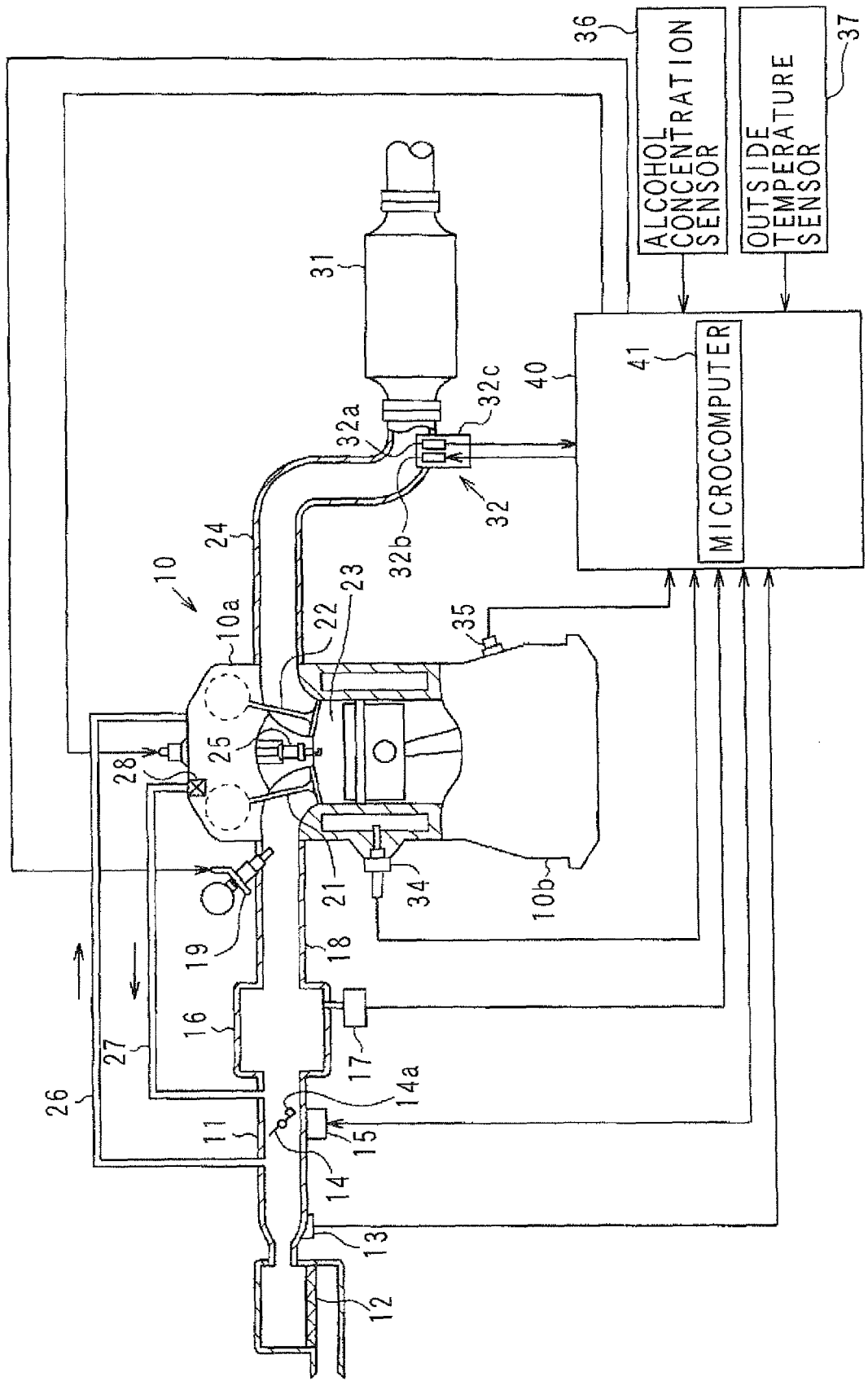
FIG. 1 is a diagram illustrating a system general configuration of a vehicle engine, to which a valve freeze control apparatus and a sensor element breakage control apparatus according to the first embodiment of the present invention are applied.

Embodiments of the present invention will be described with reference to accompanying drawings.

First Embodiment

The present embodiment describes an engine control system that mainly includes vehicle multiple cylinder engine, which is an internal combustion engine as shown in FIG. 1 that shows an entire schematic structure of the engine control system. The engine of the present embodiment is an ignition engine and is designed to be able to use alcohol-gasoline mixture, gasoline, and alcohol fuel. For example, the alcohol-gasoline mixture includes alcohol (for example, ethanol, methanol) added into gasoline. The above gasoline has no alcohol mixed therein (alcohol concentration 0%). The alcohol fuel is based only on alcohol (alcohol concentration 100%). The control system has an electronic control unit (ECU) and executes fuel injection quantity control, ignition timing control, and idle-reduction or idle-stop control.

In an engine 10 shown in FIG. 1, an air cleaner 12 is provided most upstream of an intake pipe 11 (intake passage). An air flow meter 13 is located downstream of the air cleaner 12 in order to detect intake air amount. A throttle valve 14 is located downstream of the air flow meter 13 and an opening of the throttle valve 14 is adjusted or controlled by a throttle actuator 15, such as a DC motor. The opening of the throttle valve 14 (throttle opening) is detected by a throttle opening sensor included in the throttle actuator 15. A surge tank 16 is located downstream of the throttle valve 14, and the surge tank 16 is provided with an intake pipe pressure sensor 17 that detects intake pipe pressure. Also, the surge tank 16 is connected with an intake manifold 18 that introduces air to each cylinder of the engine 10. The intake manifold 18 is provided with an electromagnetic fuel injection valve 19 that is located in a vicinity of an intake port of each cylinder for injecting fuel.

Each intake port and each exhaust port of the engine 10 have an intake valve 21 and an exhaust valve 22, respectively. The intake valve 21 is opened such that air-fuel mixture is introduced into a combustion chamber 23. The exhaust valve 22 is opened such that exhaust gas after combustion is discharged to an exhaust pipe 24 (exhaust passage).

The engine 10 has a cylinder head 10a that is provided with ignition plugs 25, each of which is for the corresponding cylinder. The ignition plug 25 is applied with high voltage at required ignition timing through an ignition device (not shown) having an ignition coil. By the application of the high voltage, spark discharge is generated between opposing electrodes of each ignition plug 25, and thereby air-fuel mixture introduced into the combustion chamber 23 is ignited for combustion.

The cylinder head 10a is provided with a fresh air inflow pipe 26 and a discharge pipe 27. The fresh air inflow pipe 26 is connected with the intake pipe 11 at a position upstream of the throttle valve 14 such that part of fresh air that passes through the intake passage is introduced into the cylinder head 10a. In contrast, the discharge pipe 27 is connected with the intake pipe 11 at a position downstream of the throttle valve 14. Part of exhaust gas in the combustion chamber 23 is leaked to a crankcase 10b through a piston ring, and thereby, the leaked exhaust gas (blow-by gas) tends to remain within the crankcase 10b. However, the blow-by gas is pushed back into the intake passage through the discharge pipe 27 by fresh air that is introduced from the fresh air inflow pipe 26 into the crankcase 10b through the cylinder head 10a. As above, air in the spaces within the crankcase 10b and the cylinder head 10a is effectively ventilated or circulated.

It should be noted that the discharge pipe 27 has a PCV valve 28. When a throttle opening is small as in a case of a stand-by operation, an opening degree of the PCV valve 28 is reduced. In contrast, when the throttle opening is maximized, the PCV valve 28 operates such that the opening degree of the PCV valve 28 is also maximized. Due to the above operation, an amount of the blow-by gas flowing into the intake passage is controlled.

A catalytic converter 31, such as a three-way catalytic converter, is provided in the exhaust pipe 24 in order to clarify CO, HC, $NO_x$ in exhaust gas. Also, an air-fuel ratio sensor 32 (exhaust gas sensor device) is provided upstream of the catalytic converter 31 and the air-fuel ratio sensor 32 is used to detect or estimate an air-fuel ratio (oxygen concentration) of air-fuel mixture based on detection of the exhaust gas. The air-fuel ratio sensor 32 is a sensor used for a feed-back control, in which a fuel injection quantity injected through the fuel injection valve 19 is feed-back controlled such that an actual air-fuel ratio becomes a target air-fuel ratio (stoichiometric fuel-air ratio).

It should be noted that the air-fuel ratio sensor 32 includes a sensor element 32a, a sensor electric heater 32b (element heating device), and a housing 32c. The sensor element 32a detects an oxygen concentration, and the sensor electric heater 32b heats the sensor element 32a. The housing 32c receives therein the sensor element 32a and the sensor electric heater 32b. The sensor element 32a is not capable of outputting a normal detection value when operated under a low temperature. Thus, the sensor element 32a is heated by the sensor electric heater 32b at a time of cold start of the engine 10 such that the sensor element 32a is activated sooner after the start of the engine 10, and thereby an air-fuel ratio feedback control (described later) will be executed sooner after the start of the engine 10.

Also, the engine 10 is provided with a coolant temperature sensor 34 and a crank angle sensor 35. The coolant temperature sensor 34 detects temperature of coolant, and the crank angle sensor 35 outputs rectangular crank angle signals at predetermined crank angles (for example, 30° CA intervals) of the engine 10. Also, the present system includes an alcohol concentration sensor 36 and an outside temperature sensor 37. The alcohol concentration sensor 36 detects alcohol concentration of fuel, and the outside temperature sensor 37 detects outside temperature. The alcohol concentration sensor 36 may be mounted at a fuel tank (not shown) or may be mounted in a fuel pipe (now shown) at a position between the fuel tank and the fuel injection valve 19.

An ECU 40 mainly includes a well-known microcomputer 41 having a CPU, a ROM, a RAM, and executes various control programs stored in the ROM in order to control the engine 10 in various manners in accordance with the engine operational state at the time. In other words, the microcomputer 41 of the ECU 40 receives detection signals from the above various sensors, and computes the fuel injection quantity, the ignition timing, and the throttle opening based on the various detection signals. Thus, the microcomputer 41 controls the fuel injection valve 19, the ignition device, and the throttle valve 14, or controls energization to the sensor electric heater 32b of the air-fuel ratio sensor 32.

Also, the ECU 40 computes the actual air-fuel ratio based on the signal outputted from the air-fuel ratio sensor 32, and the ECU 40 controls the fuel injection quantity injected by the fuel injection valve 19 such that the actual air-fuel ratio becomes the target value (for example, theoretical air fuel ratio). Thus, the above air-fuel ratio feed-back control improves the emission performance. The theoretical air fuel ratio indicates different values for different alcohol concentrations in the alcohol blended fuel. Thus, the target value is changeable depending on the alcohol concentration detected by the alcohol concentration sensor 36.

During an excessively-low-temperature operational state, where the outside temperature drops below freezing, the condensed water attached to the throttle valve 14 may be frozen even while the engine 10 is operated. Then, a rotational shaft portion of the throttle valve 14 may be frozen, and thereby the throttle valve 14 may become disabled to rotate. For the countermeasure for the above freeze the throttle valve 14 is heated by a valve electric heater 14a (freeze control device) in order to evaporate the condensed water or to melt the frozen condensed water.

Also, when the sensor electric heater 32b is activated to heat the sensor element 32a of the air-fuel ratio sensor 32 while the condensed water is attached to the sensor element 32a, the water-attached part of the sensor element 32a may locally have a lower temperature compared with the other part of the sensor element 32a. As a result, the above local cooling may cause thermal strain of the sensor element 32a, and thereby the sensor element 32a breaks disadvantageously. As the countermeasure for the breakage of the sensor element 32a caused by the attached water, energization start timing of starting the energization to the sensor electric heater 32b may be delayed by a predetermined time during the cold start of the engine 10. As a result, the water attached to the sensor element 32a is made evaporate before the energization to the sensor electric heater 32b is started, and thereby it is possible to prevent the heating of the sensor element 32a while the sensor element 32a is covered with water.

When the alcohol blended fuel (for example, alcohol-gasoline mixture, alcohol fuel) is used, water content in exhaust gas is greater compared with water content in exhaust gas of normal gasoline having no alcohol mixed therewith. Thus, the inventors have found that even when condensed water generation condition is not satisfied, moisture (water) in exhaust gas may be attached to a throttle valve or a sensor element. In other words, it is found that when the alcohol blended fuel is used, there is needed to prevent or deal with deficiency caused by the freeze and attached water even when the condensed water generation condition is not satisfied in a conventional art.

The present embodiment is made in view of the above deficiency or disadvantage of the conventional art. Next, there will be described a procedure of a determination process executed by the microcomputer 41 of the ECU 40 for determining whether to start (execute) a countermeasure against the freeze and a countermeasure against the breakage caused by the attached water with reference to a flow chart in FIG. 2. The process in FIG. 2 is executed periodically at predetermined intervals after the process is started by a trigger that corresponds to the turning on of the ignition switch.

Firstly, at step S10, a threshold value TH1 (reference value) is set based on a physical quantity that is correlated with a likelihood of generation of the condensed water. For example, the physical quantity may be the outside temperature detected by the outside temperature sensor 37 or may be an operation period measured between the starting of the engine 10 and the stopping of the engine 10. Then, control proceeds to step S20 corresponding to start determination means, where it is determined whether the alcohol concentration detected by the alcohol concentration sensor 36 is equal to or greater than the threshold value TH1 that has been set at step S10.

When it is determined that the alcohol concentration ≧TH1, control proceeds to steps S30, S40, where each of flags is set such that the countermeasure against the freeze and the countermeasure against the breakage caused by the attached water will be executed correspondingly. Thus, the valve electric heater 14a is energized, and thereby the throttle valve 14 is heated. Also, the ECU 40 executes a delay control (heat timing delay means) at S30 such that the energization start timing of starting the energization to the sensor electric heater 32b is delayed by the predetermined time. It should be noted that when the ECU 40 executes the delay control to the sensor electric heater 32b, the ECU 40 serves as "breakage limiting device", and when the ECU 40 controls the energization to the valve electric heater 14a, the ECU 40 serves as "freeze control device".

In general, when the alcohol concentration in fuel is higher, the water content in exhaust gas becomes greater. Thus, water becomes more likely to attach the sensor element 32a when the alcohol concentration in fuel is higher. Also, water content in exhaust gas may flow into the intake passage through the fresh air inflow pipe 26 and the discharge pipe 27. As a result, the increase of water content in exhaust gas increases water content in intake air accordingly, and thereby the water becomes more likely to attach to the throttle valve 14 that is provided in the intake passage in a conventional art.

The present embodiment is made in view of the above. Thus, when it is determined at step S20 that the alcohol concentration is equal to or higher than the predetermined threshold value TH1, the countermeasure against the freeze and the countermeasure against the breakage caused by the attached water are executed. As a result, for example, even in a case, where the outside temperature is relatively high, if the alcohol concentration is detected relatively high (for example, higher than the threshold value TH1), the countermeasure against the freeze and the countermeasure against the breakage caused by the attached water are reliably executed. Thus, it is possible to prevent the throttle valve 14 from being frozen, and thereby prevent the malfunction of the throttle valve 14 caused by the freeze. Also, it is possible to prevent the breakage of the sensor element 32a due to the water attachment. Thus, the reliability of the above preventions is effectively improved.

Furthermore, in the present embodiment, in a case, where the condensed water is more likely to be generated, the threshold value TH1, which is used at step S20 for determining the execution of the countermeasures, is set lower at step S10. As a result, the malfunction of the throttle valve 14 and the breakage of the sensor element 32a are more effectively and more reliably prevented. For example, when the outside temperature is lower than a predetermined temperature, or when the engine operation period is shorter than a predetermined period, the temperature in the exhaust pipe 24 and the intake pipe 11 becomes lower accordingly. Thus, the threshold value TH1 is reduced to a smaller value to effectively facilitate the starting of the above countermeasures because the condensed water is more likely to be generated in the above condition, for example. More specifically, the reference value TH1 is reduced to a certain value when the operation period of the engine 1o is shorter than the predetermined period or when the outside temperature is lower than the predetermined temperature, for example. Also, the reference value (TH1) is changed to a smaller value as the operation period of the engine 10 becomes shorter or as the outside temperature becomes lower, for example.

Second Embodiment

In the first embodiment, it is determined whether to execute the countermeasure against the freeze and the countermeasure against the breakage caused by the attached water based on the alcohol concentration. In contrast, in the present embodiment, an execution level of executing the countermeasure against the freeze and the countermeasure against the breakage caused by the attached water is determined based on the alcohol concentration. In other words, a freeze limitation level of limiting the throttle valve 14 from being frozen, and a breakage limitation level of limiting the sensor element 32a from breaking are changed based an the alcohol concentration.

Next, there will be more specifically described a setting process executed by the microcomputer 41 of the ECU 40 for setting the execution content (or execution level) of the countermeasure against freeze and the countermeasure against the breakage caused by the attached water with reference to a flow chart in FIG. 3. The process in FIG. 3 is repeated periodically at predetermined intervals after the process is started by the trigger that corresponds to the turning on of the ignition switch.

Firstly, it is determined at step S50 whether to execute the countermeasure against freeze and the countermeasure against the breakage caused by the attached water. Specifically, when the outside temperature indicates a low temperature that is equal to or lower than a predetermined threshold value TH2, it is determined that the above various countermeasures need to be executed.

Then, when the outside temperature is equal to or lower than the threshold value TH2, the control proceeds to step S60, corresponding to limitation level setting means, where the breakage limitation level of the sensor element 32a is set based on the alcohol concentration detected by the alcohol concentration sensor 36. Specifically, when the alcohol concentration is higher, the electric power supply amount to the sensor electric heater 32b is reduced accordingly such that a level of heating the sensor element 32a is reduced. In other words, when the alcohol concentration is higher, an energization duty ratio is reduced accordingly such that an amount of heat applied to the sensor element 32a is reduced, for example. The above control corresponds to heat level reducing means. As above, due to the application of less heat to the sensor element 32a, the sensor element 32a is more limited from becoming broken caused by the heat application in a case, where the sensor element 32a is more likely to be covered with water. As a result, the breakage limitation level of the sensor element 32a is effectively increased accordingly to the increase of the alcohol concentration.

Then, control proceeds to step S70 corresponding to limitation level setting means, where the freeze limitation level of the throttle valve 14 is set based on the alcohol concentration detected by the alcohol concentration sensor 36. Specifically, when the alcohol concentration is higher, the electric power supply amount to the valve electric heater 14a is increased accordingly or the energization duty ratio is increased accordingly such that the heating level of the throttle valve 14 is increased. As above, due to the application of more heat to the throttle valve 14, the throttle valve 14 is more limited from becoming frozen. As a result, the freeze limitation level of the throttle valve 14 is effectively increased accordingly to the increase of the alcohol concentration. Then, control proceeds to step S80, where the sensor electric heater 32b and the valve electric heater 14a are duty controlled based on the duty ratios set at steps S60, S70.

As above, in the present embodiment, the freeze limitation level of the throttle valve 14 and the breakage limitation level of the sensor element 32a are increased at steps S60, S70 accordingly to the increase of the alcohol concentration. As a result, for example, even in a case, where the outside temperature is high, the limitation levels are effectively and appropriately increased if the alcohol concentration is high. Thus, the malfunction of the throttle valve 14 caused by freeze is effectively and reliably prevented. Also, the breakage of the sensor element 32a caused by the attached water is effectively and reliably prevented.

Other Embodiment

The present invention is not limited to the above embodiments. However, any combination of characteristics in the above embodiments may be made. Also, each of the embodiments may be modified as follows.

In each of the embodiments, the valve electric heater 14a is employed to serve as a valve heating device (freeze control device). However, the throttle valve 14 may be alternatively heated by an engine coolant. Also, a vibration control device adapted to vibrate the throttle valve 14 may be employed to serve an alternative freeze control device. In this alternative case, it is possible to remove the water attached to the throttle valve 14 by vibrating the throttle valve 14, and thereby the freeze of the water on the throttle valve 14 is effectively limited. Alternatively, a valve opening device adapted to maintain the throttle valve 14 opened at the stopping of the engine 10 may be employed. Due to the above, there is generated a clearance between an inner surface of the intake pipe 11 and the throttle valve 14, and thereby fixation of the of the inner surface of the intake pipe 11 with the throttle valve 14 caused by the freeze is limited effectively.

The first embodiment may be combined with the second embodiment. In other words, it is determined whether to execute the countermeasure against freeze and the countermeasure against the breakage caused by the attached water based on the alcohol concentration. When it is determined that the above countermeasures are to be executed, the freeze limitation level of the throttle valve 14 and the breakage limitation level of the sensor element 32a are variously set based on the alcohol concentration.

In each of the above embodiments, the countermeasure against the freeze is executed to the throttle valve 14. However, the countermeasure against the freeze may be alternatively executed to various valves provided in the intake pipe 11 or in the exhaust pipe 24 instead of the throttle valve 14. The various valves may be, for example, an EGR valve (not shown), the PCV valve 28 and a secondary air valve (not shown).

The EGR valve controls a recirculation flow amount (EGR amount) of exhaust gas that is returned to intake gas. The PCV valve is provided in a passage, which is used for introducing the blow-by gas into the intake passage, such that flow of the blow-by gas is controlled. The primary air valve controls an amount of secondary air supplied to the exhaust passage from a part upstream of an exhaust gas purifying device in order to facilitate the clarifying performance of the exhaust gas purifying device. For example, the exhaust gas purifying device is provided in the exhaust passage and is a catalytic converter.

In each of the above embodiments, the countermeasure against the breakage is executed to the air-fuel ratio sensor 32 that detects the oxygen concentration in exhaust gas. However, the countermeasure against the breakage may be alternatively executed to the other sensor other than the air-fuel ratio sensor 32. For example, the other sensor may be a sensor that senses an $NO_x$ concentration or an HC concentration in exhaust gas.

Additional advantages and modifications will readily occur to those skilled in the art. The invention in its broader terms is therefore not limited to the specific details, representative apparatus, and illustrative examples shown and described.

What is claimed is:

1. A valve freeze control apparatus for an internal combustion engine comprising:
   a concentration sensor adapted to detect an alcohol concentration of fuel supplied to the internal combustion engine;
   a valve that is provided in one of an intake passage and an exhaust passage of the internal combustion engine, wherein the valve controls flow of air that passes through the one of the intake and exhaust passages;
   a passage configured to supply a part of exhaust gas to the intake passage;
   a freeze control device adapted to limit malfunction of the valve caused by freeze of water in the exhaust gas, the water having been attached to the valve; and
   start determination means for determining to start the freeze control device when the alcohol concentration detected by the concentration sensor is equal to or greater than a reference value.

2. The valve freeze control apparatus according to claim 1, wherein:
   the start determination means changes the reference value such that the start determination means determines to start the freeze control device when an operation period of the internal combustion engine measured from starting of the engine to stopping of the engine is shorter than a predetermined period or when outside temperature is lower than a predetermined temperature.

3. The valve freeze control apparatus according to claim 2, wherein:
   the start determination means reduces the reference value when the operation period of the internal combustion engine is shorter than the predetermined period or when the outside temperature is lower than the predetermined temperature.

4. The valve freeze control apparatus according to claim 2, wherein:
   the start determination means changes the reference value to a smaller value as the operation period of the internal combustion engine becomes shorter or as the outside temperature becomes lower.

5. The valve freeze control apparatus according to claim 1, wherein:
   the one of the intake and exhaust passages is the intake passage; and
   the valve is a throttle valve that adjusts an amount of intake air.

6. The valve freeze control apparatus according to claim 1, wherein:
   the freeze control device is at least one of the followings:
   a valve heating device adapted to heat the valve;
   a vibration control device adapted to vibrate the valve; and
   a valve opening device adapted to maintain the valve opened while the internal combustion engine is stopped.

7. A valve freeze control apparatus for an internal combustion engine comprising:
   a concentration sensor adapted to detect an alcohol concentration of fuel supplied to the internal combustion engine;
   a valve that is provided in one of an intake passage and an exhaust passage of the internal combustion engine, wherein the valve controls flow of air that passes through the one of the intake and exhaust passages;
   a passage configured to supply a part of exhaust gas to the intake passage;
   a freeze control device adapted to limit malfunction of the valve caused by freeze of water in the exhaust gas, the water having been attached to the valve; and
   limitation level setting means for changing a limitation level for limiting the freeze of water by controlling the freeze control device, wherein:
   the limitation level setting means increases the limitation level of the freeze more as the alcohol concentration detected by the concentration sensor indicates a higher concentration.

8. The valve freeze control apparatus according to claim 7, wherein:
   the one of the intake and exhaust passages is the intake passage; and
   the valve is a throttle valve that adjusts an amount of intake air.

9. The valve freeze control apparatus according to claim 7, wherein:
   the freeze control device is at least one of the followings:
   a valve heating device adapted to heat the valve;
   a vibration control device adapted to vibrate the valve; and
   a valve opening device adapted to maintain the valve opened while the internal combustion engine is stopped.

10. A sensor element breakage control apparatus for an internal combustion engine comprising:

a concentration sensor adapted to detect an alcohol concentration of fuel supplied to the internal combustion engine;

an exhaust gas sensor device that is provided in an exhaust passage of the internal combustion engine, wherein the exhaust gas sensor device includes:
- a sensor element adapted to sense a concentration of a specific component in exhaust gas; and
- an element heating device adapted to heat the sensor element;

a breakage limiting device adapted to limit breakage of the sensor element when the element heating device is heated while water in exhaust gas is attached to the sensor element; and start determination means for determining to start the breakage limiting device when the alcohol concentration detected by the concentration sensor is equal to or greater than a reference value.

11. The sensor element breakage control apparatus according to claim 10, wherein:
the start determination means changes the reference value such that the start determination means is more likely to determine to start the breakage limiting device when an operation period of the internal combustion engine measured from starting of the engine to stopping of the engine is shorter than a predetermined period, or when outside temperature is lower than a predetermined temperature.

12. The sensor element breakage control apparatus according to claim 11, wherein:
the start determination means reduces the reference value when the operation period of the internal combustion engine is shorter than the predetermined period or when the outside temperature is lower than the predetermined temperature.

13. The sensor element breakage control apparatus according to claim 11, wherein:
the start determination means changes the reference value to a smaller value as the operation period of the internal combustion engine becomes shorter or as the outside temperature becomes lower.

14. The sensor element breakage control apparatus according to claim 10, wherein:
the breakage limiting device is at least one of the followings:
heat timing delay means for delaying timing to start heating of the element heating device; and
heat level reducing means for reducing a heating level of heating the sensor element by the element heating device.

15. A sensor element breakage control apparatus for an internal combustion engine comprising:
a concentration sensor adapted to detect an alcohol concentration of fuel supplied to the internal combustion engine;

an exhaust gas sensor device that is provided in an exhaust passage of the internal combustion engine, wherein the exhaust gas sensor device includes:
- a sensor element adapted to sense a concentration of a specific component in exhaust gas; and
- an element heating device adapted to heat the sensor element;

a breakage limiting device adapted to limit breakage of the sensor element when the element heating device is heated while water in exhaust gas has been attached to the sensor element; and limitation level setting means for changing a limitation level for limiting the breakage of the sensor element by controlling the breakage limiting device, wherein:
the limitation level setting means increases the limitation level of the breakage more as the alcohol concentration detected by the concentration sensor indicates a higher concentration.

16. The sensor element breakage control apparatus according to claim 15, wherein:
the breakage limiting device is at least one of the followings:
heat timing delay means for delaying timing to start heating of the element heating device; and
heat level reducing means for reducing a heating level of heating the sensor element by the element heating device.

* * * * *